(12) United States Patent
Peterson

(10) Patent No.: US 11,145,040 B2
(45) Date of Patent: Oct. 12, 2021

(54) DYNAMIC BACKGROUND CLUTTER SUPPRESSION

(71) Applicant: The Boeing Company, Chicago, IL (US)

(72) Inventor: Scott M Peterson, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 16/536,848

(22) Filed: Aug. 9, 2019

(65) Prior Publication Data

US 2021/0042896 A1 Feb. 11, 2021

(51) Int. Cl.
*G06T 5/00* (2006.01)
*G06T 5/50* (2006.01)
(Continued)

(52) U.S. Cl.
CPC ............. *G06T 5/50* (2013.01); *B64D 45/00* (2013.01); *G06T 5/002* (2013.01); *G06T 7/20* (2013.01);
(Continued)

(58) Field of Classification Search
CPC .. G06T 5/50; G06T 5/002; G06T 5/20; G06T 5/003; G06T 5/007; G06T 5/009; G06T 7/20; G06T 7/254; G06T 2207/10032; G06T 2207/20224; G06T 2207/10016; G06T 2207/20024; G06T 2207/20182; G06T 2207/20192; G06T 2207/20216; G06T 2207/30212; G06T 2207/30252; G06T 2207/20012; G06T 2207/20021; B64D 45/00; B64D 47/08; B64D 39/00; G08G 5/025; H04N 1/2145; H04N 5/144; H04N 5/217; H04N 5/243; H04N 5/213; H04N 19/80; H04N 19/86; B60R 2300/30; G06K 9/00744; G06K 9/00758; G06K 9/3233; G06K 9/3241; G06K 9/36; G06K 9/40; G06K 9/46; G06K 9/4604; G06K 9/4609; G06K 9/4619; G06K 9/4623;
(Continued)

(56) References Cited

U.S. PATENT DOCUMENTS 8,446,468 B1 * 5/2013 Medioni ................. G06T 7/337
348/144
9,685,056 B2 * 6/2017 Klimer .................... G06T 7/262
(Continued)

*Primary Examiner* — Jose L Couso
(74) *Attorney, Agent, or Firm* — McDonnell Boehnen Hulbert & Berghoff LLP

(57) ABSTRACT

In an example, method of dynamically suppressing background clutter in a stream of images is described. The method includes receiving a stream of images, wherein the stream of images comprises background objects and foreground objects, separating the stream of images into a first image set and a second image set, applying a grid to each image in the second image set, wherein the grid contains a plurality of grid cells, determining a movement of pixel content within each of the plurality of grid cells for each image of the second image set, extrapolating the movement of pixel content to a time of the first image set to obtain a time-adjusted second image set, and subtracting the time-adjusted second image set from the first image set to obtain a clutter-suppressed image set.

20 Claims, 6 Drawing Sheets

(51) Int. Cl.
*G06T 7/20* (2017.01)
*B64D 45/00* (2006.01)

(52) U.S. Cl.
CPC ............... *G06T 2207/10032* (2013.01); *G06T 2207/20224* (2013.01)

(58) Field of Classification Search
CPC ...... G06K 9/4628; G06K 9/4642; G06K 9/60; G06K 2009/2045; G06K 2009/3291; G06K 2009/363
See application file for complete search history.

(56) References Cited

U.S. PATENT DOCUMENTS

| | | | | |
|---|---|---|---|---|
| 2004/0062450 | A1* | 4/2004 | Kondo | G06T 7/194 |
| | | | | 382/266 |
| 2004/0080623 | A1* | 4/2004 | Cleveland | H04N 5/23254 |
| | | | | 348/208.1 |
| 2013/0094694 | A1* | 4/2013 | Newman | G06T 7/254 |
| | | | | 382/103 |
| 2015/0334398 | A1* | 11/2015 | Socek | G06T 7/174 |
| | | | | 375/240.26 |
| 2017/0039466 | A1* | 2/2017 | Krishna | G06K 19/07762 |

* cited by examiner

APPLYING, BY THE COMPUTING SYSTEM, A PULSE SHAPE MATCHED FILTER TO THE CLUTTER-SUPPRESSED IMAGE SET TO ENHANCE A SIGNAL-TO-NOISE-RATIO (SNR) OF THE CLUTTER-SUPPRESSED IMAGE SET — 514

FIG. 6

APPLYING A FILTER BANK TO THE CLUTTER-SUPPRESSED IMAGE SET — 516 — 514

FIG. 7

DETECTING, BY THE COMPUTING SYSTEM, THE FOREGROUND OBJECTS OF THE STREAM OF IMAGES BY APPLYING CONSTANT FALSE ALARM RATE (CFAR) DETECTION TO THE CLUTTER-SUPPRESSED IMAGE SET — 518

FIG. 8

APPLYING, BY THE COMPUTING SYSTEM, THE GRID TO EACH IMAGE IN THE FIRST IMAGE SET — 520

DETERMINING, BY THE COMPUTING SYSTEM, A MOVEMENT OF PIXEL CONTENT ASSOCIATED WITH THE FIRST IMAGE SET WITHIN EACH OF THE PLURALITY OF GRID CELLS — 522

FIG. 9

DYNAMIC BACKGROUND CLUTTER SUPPRESSION

FIELD

The present disclosure relates generally to operation of an aircraft, and more particularly, to methods of suppressing background clutter in an image stream for assisting with targeting an aircraft for refueling.

BACKGROUND

A tanker aircraft is commonly used to refuel a target aircraft or airplane midflight. Typically, a tanker aircraft has to identify the target aircraft when initiating the refueling process. This can be a difficult process when air and weather conditions interfere with an operator's ability to visually identify the target aircraft against a background on an image display.

Existing methods for identifying the target aircraft traditionally attempt to suppress noise and clutter to identify a pixel position of the target aircraft using threshold segmentation or other methods. When little is known about the background scene surrounding the target aircraft, clutter suppression is achieved by differencing the background scene without the target aircraft present from a background scene with the target aircraft present. However, this can be particularly difficult when the background scene is moving in seemingly unpredictable directions (i.e., clouds swirling).

Existing methods require a tanker operator to wait until the target aircraft is close enough to identify it, which can result in unpreparedness for the refueling process.

What is needed is a system that estimates the movement of the background scene, allowing for the suppression of clutter and efficient identification of the target aircraft in adverse conditions, and for other reasons.

SUMMARY

In an example, a method of dynamically suppressing background noise and clutter is described. The method comprises receiving a stream of images that has background objects and foreground objects, separating the stream of images into a first image set and a second image set, applying a grid with a plurality of grid cells to each image in the second image set, determining a movement of pixel content within each of the plurality of grid cells for each image of the second image set, extrapolating the movement of pixel content to a time of the first image set to obtain a time-adjusted second image set, and subtracting the time-adjusted second image set from the first image set to obtain a clutter-suppressed image set that includes the foreground objects of the stream of images.

In another example, a non-transitory computer readable medium is described having stored thereon instructions, that when executed by one or more processors of a computing system, cause the computing system to perform acts. The acts comprise receiving a stream of images that has background objects and foreground objects, separating the stream of images into a first image set and a second image set, applying a grid with a plurality of grid cells to each image in the second image set, determining a movement of pixel content within each of the plurality of grid cells for each image of the second image set, extrapolating the movement of pixel content to a time of the first image set to obtain a time-adjusted second image set, and subtracting the time-adjusted second image set from the first image set to obtain a clutter-suppressed image set that includes the foreground objects of the stream of images.

In another example, a computing system is described comprising one or more processors and non-transitory computer-readable medium having stored thereon program instructions that, upon execution by the one or more processors, cause the computing system to perform a set of acts. The acts comprise receiving a stream of images that has background objects and foreground objects, separating the stream of images into a first image set and a second image set, applying a grid with a plurality of grid cells to each image in the second image set, determining a movement of pixel content within each of the plurality of grid cells for each image of the second image set, extrapolating the movement of pixel content to a time of the first image set to obtain a time-adjusted second image set, and subtracting the time-adjusted second image set from the first image set to obtain a clutter-suppressed image set that includes the foreground objects of the stream of images.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6 shows a flowchart of an example method for use with the method shown in FIG. 5, according to an example implementation.

FIG. 7 shows a flowchart of another example method for use with the method shown in FIG. 5, according to an example implementation.

FIG. 8 shows a flowchart of another example method for use with the method shown in FIG. 5, according to an example implementation.

FIG. 9 shows a flowchart of another example method for use with the method shown in FIG. 5, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for assisting tanker aircraft to identify target aircraft in adverse conditions are described. More specifically, example methods and systems dynamically suppress background clutter and noise to allow a tanker operator to quickly and efficiently identify target aircraft on an image display.

Example methods and systems perform operations on a stream of images to produce two conditioned frames—one representing a background scene at the present time, and one representing a background scene at a time slightly in the past but extrapolated to the present time. After producing the two frames, the system can subtract the two frames to cancel, or greatly reduce, any noise and clutter present in the background objects of the stream of images. Further, since the target aircraft is moving relative to the background objects, it is not subtracted from the image set, allowing for easy identification of the target aircraft.

While the methods and systems may be most beneficial when implemented when a background scene contains high background spatial complexity, the methods and systems are equally effective for scenarios involving little to no background noise and clutter.

Figure 1:
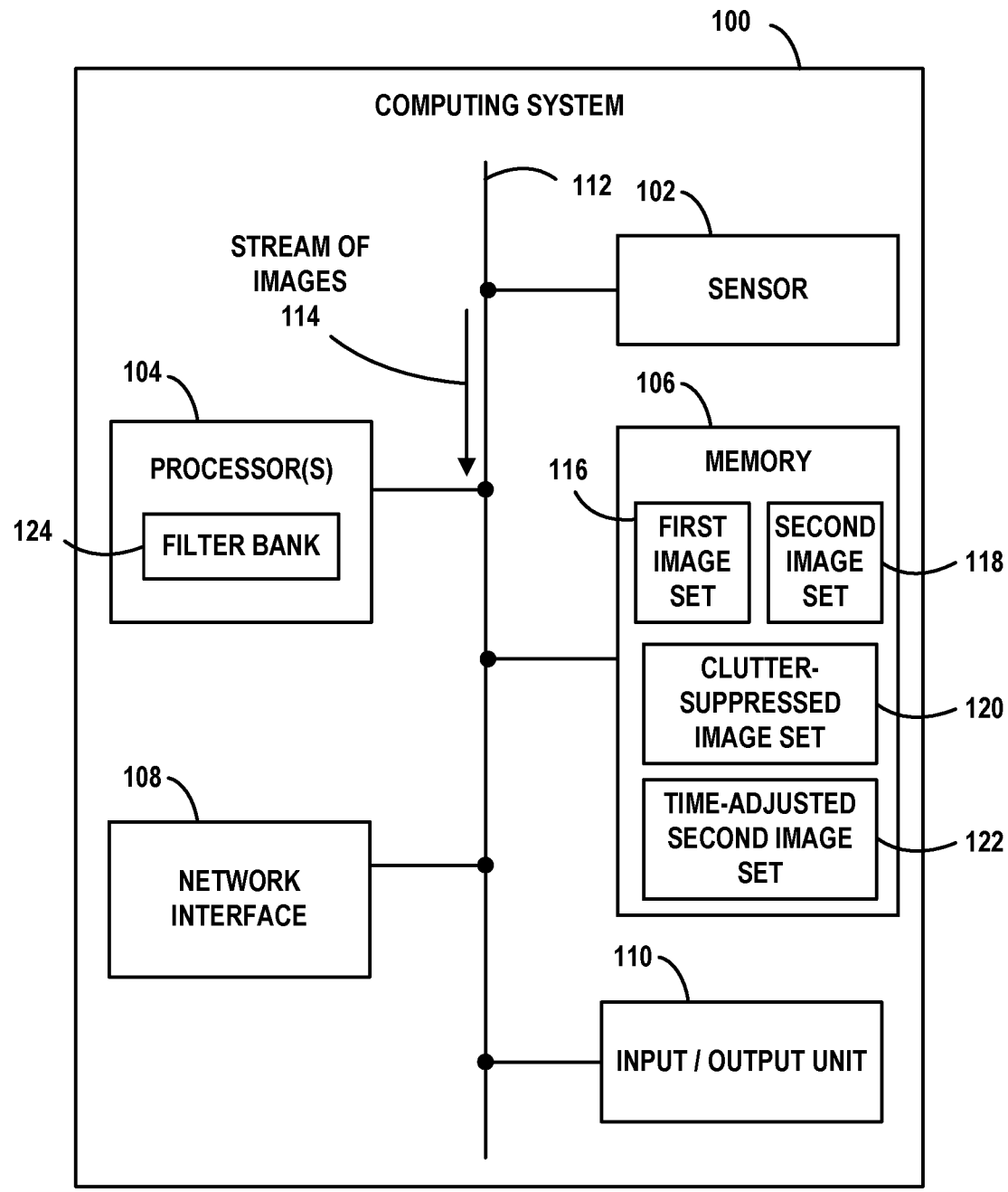
FIG. 1 illustrates a block diagram of an example computing system, according to an example implementation.

Referring now to the figures, FIG. 1 illustrates a block diagram of an example of a computing system 100, according to an example implementation. The computing system 100 includes a sensor 102, processor(s) 104, memory 106, a network interface 108, an input/output unit 110, and system bus 112.

The sensor 102 includes a camera sensor configured to capture a stream of images 114 from an environment. In some examples, the sensor 102 can be a remote visual system (RVS), charged coupled device (CCD), or a complementary metal-oxide-semiconductor (CMOS) sensor. Other types of sensors exist and can be used as the sensor 102. The sensor 102 may capture a stream of images 114 and then transmit the stream of images 114 to the processor(s) 104 for processing in accordance with the methods and systems described herein.

The processor(s) 104 may be general-purpose processors or special purpose processors (e.g., digital signal processors, application specific integrated circuits, etc.). The processor(s) 104 may receive inputs from the sensor 102 as well as from other sensors, and process the inputs to generate outputs that are stored in the memory 106 and used to display an output to an image display via input/output unit 110. The processor(s) 104 can be configured to execute executable instructions (e.g., computer-readable program instructions) that are stored in the memory 106 and are executable to provide the functionality of the computing system 100 described herein.

The memory 106 may include or take the form of one or more computer-readable storage media that can be read or accessed by the processor(s) 104. The memory 106 may store one or more image sets that are to be processed or have been processed. These image sets may include a first image set 116, a second image set 118, a clutter-suppressed image set 120, and a time-adjusted second image set 122. The computer-readable storage medium can include volatile and/or non-volatile storage components, such as optical, magnetic, organic or other memory or disc storage, which can be integrated in whole or in part with the processor(s) 104. The memory 106 is considered a non-transitory computer readable medium. In some examples, the memory 106 can be implemented using a single physical device (e.g., one optical, magnetic, organic or other memory or disc storage unit), while in other examples, the memory 106 can be implemented using two or more physical devices.

The network interface 108 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the network interface 108 may be configured to receive input data from one or more devices, and may also be configured to send output data to other devices.

The input/output unit 110 receives and outputs information, such as outputting a processed image stream stored in the memory 106 to an image display for use by a tanker aircraft operator to identify a target aircraft. Thus, the input/output unit 110 may be similar to the network interface 108 and can be a wireless interface (e.g., transmitter) or a wired interface as well.

In one example configuration, the computing system 100 is positioned on, or is a part of, a tanker aircraft. The sensor 102 may be positioned to capture a scene from the perspective of the tanker aircraft, including a front view, side view, or rear view of the tanker aircraft.

In one example, in operation, the sensor 102 captures an image stream from an environment and sends the image stream to the processor(s) 104 for processing via system bus 112. The processor(s) 104 then applies a method of dynamic background clutter suppression to obtain a clutter-suppressed image set 120. The processor(s) 104 then send the clutter-suppressed image set 120 to the memory 106 for storage. The computing system 100 then sends the clutter-suppressed image set 120 via network interface 108 or input/output unit 110 to an image display of a tanker aircraft (not shown). An operator of the tanker aircraft can then use the clutter-suppressed image set 120 to identify a target aircraft for midflight refueling when exposed to any flight vehicle and background content during expected tanker engagements.

Figure 2:
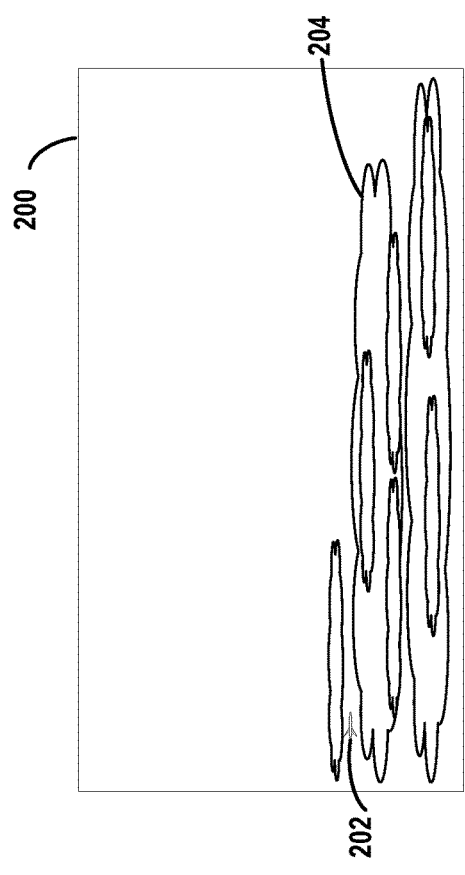
FIG. 2 is an example frame from a stream of images depicting a background scene, according to an example implementation.

FIG. 2 is an example frame 200 from an image stream depicting a background scene, according to an example implementation. The example frame 200 may have been one frame from the stream of images 114 captured by the sensor 102 as described with respect to FIG. 1. After capturing, the sensor 102 may send the example frame 200, along with the other frames in the stream of images 114, to the processor(s) 104 for processing.

The example frame 200 includes foreground object 202 and background objects 204. The example frame 200 may represent any one of the images of the image stream captured by the sensor 102 at some point in time. For example, the example frame 200 may represent the most recent image captured by the sensor 102 or the first image captured by the sensor 102.

The foreground object 202 includes an aircraft that a tanker aircraft is targeting for a midflight refuel. The foreground object 202 may be represented as a single pixel in the example frame 200, or as multiple pixels, depending on the distance of the foreground object 202 from the sensor 102.

The background objects 204 includes all other objects other than the foreground object 202 in the example frame 200. The background objects 204 may include clouds, terrain, and other environmental structures. The background objects 204 may have a pixel movement between adjacent frames of the captured stream of images 114. That is, each object that makes up background objects 204 (e.g., clouds) comprises a number of pixels in the example frame 200 that may move over time.

In operation, once the sensor 102 captures the example frame 200 and sends it to the processor(s) 104, processor(s) 104 may stabilize the received example frame 200 with the other frames in the stream of images 114 to achieve an image set that can be processed. This stabilization may involve a cross-correlation operation between the received frames over the entire field of view of the sensor 102, following by a full-field re-registration so that gross line-of-sight (LOS) pointing shifts are removed. This ensures that the remaining offset differences are due to the overall point of view position changes, which is beneficial for frame extrapolation and subtraction.

After the processor(s) 104 stabilizes the frames of the stream of images 114, processor(s) 104 organizes them into image sets. This is accomplished by segmenting the stream of images 114 into first image set 116 and second image set 118, and storing the first image set 116 and the second image set 118 in a First-In-First-Out (FIFO) data structure. The number of images in each image set ranges from one frame to five frames. However, the number of images in each set may change based on the frame rate of the sensor 102. For example, the higher the frame rate of the sensor 102, the more images in the image set. The first image set 116 stored in the FIFO represents the first images captured by the sensor 102 and the second image set 118 stored in the FIFO represents the most recent images captured by the sensor 102. However, there may be more than two image sets. The FIFO may be stored in the memory 106. Once the first image set 116 and the second image set 118 are stored in the FIFO, the processor(s) 104 starts to process the first image set 116 and the second image set 118, starting with the first image set 116.

Figure 3:
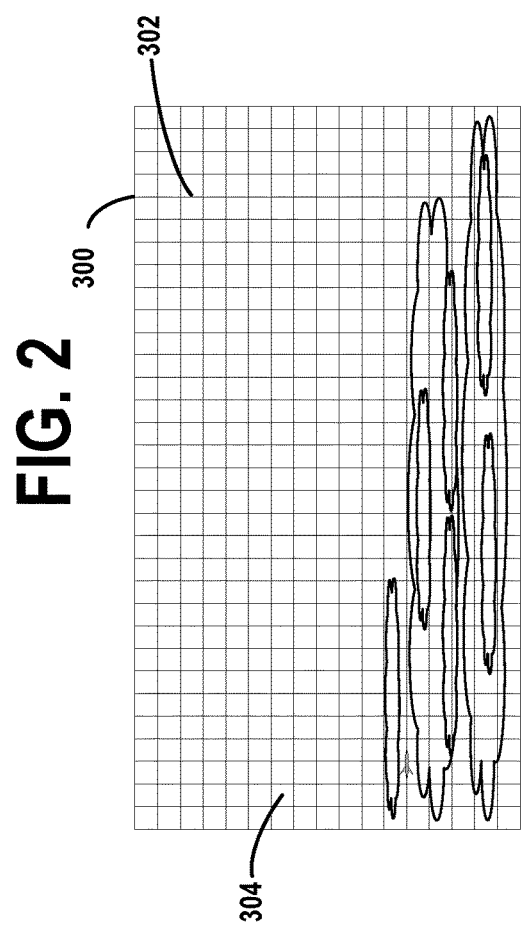
FIG. 3 is a processed version of the example frame of FIG. 2, according to an example implementation.

FIG. 3 is a processed example frame 300, according to an example implementation. The processed example frame 300 is the first frame of the first image set 116 being processed by processor(s) 104. The processed example frame 300 may include the same or similar elements as example frame 200 shown in FIG. 2. The processor(s) 104 start processing the processed example frame 300 by overlaying a grid 302 that defines a plurality of grid cells 304.

The grid 302 may be a Cartesian grid used by the systems and methods described herein to determine movement of the background objects that make up the background objects 204. To accomplish this, the processor(s) 104 determine local movement of the background objects within each of the plurality of grid cells 304. The local movement of the background objects includes the direction and magnitude of movement within each of the plurality of grid cells 304. The local movement of the background objects is determined by analyzing the background objects in each of the plurality of grid cells 304 over time (e.g., sequentially from one frame of the stream of images 114 to the next).

To assist in analyzing the background objects in each of the plurality of grid cells 304, processor(s) 104 may sample regions of the structures that define the background objects (e.g., clouds and terrain) in background objects 204 into smaller regions of sub-substructures. To sample regions of the structures, processor(s) 104 may divide the grid cells 304 into sub-regions comprising a number of cells. During the sampling, the sub-structures are treated as ridged structures within the sampling area while moving in a 2D, linear fashion. The sub-structures may move independently with respect to each other. For example, a swirling cloud broken down into four sub-structures may have each sub-structure moving in a different direction.

One challenge with sampling cloud structures is that (i) the cloud structures evolve over time (e.g., become bigger or smaller) and (ii) the foreground object 202 is moving with respect to the evolving cloud structure. This limits the amount of possible sensor noise reduction through typical temporal sensor noise suppression techniques. One possible way to overcome this challenge is to use spatial pre-filtering of the sub-structures in combination with frame integration, which includes combining each frame of the stream of images 114 to smooth out any residual noise. Spatial pre-filtering of the sub-structures involves removing noise from large portions of the sub-structures (i.e., large, flat regions of cloud-structures) to make the frame easier to process.

Integration of the frames involve, after the sub-structures are sampled to determine local movement of the background structures in the processed example frame 300, repeating the process for each frame in the first image set 116. Then, each frame is cross-correlated at each of the plurality of grid cells 304 to determine the offset measurements of the horizontal and vertical shifts of the background objects from frame to frame.

Using the offset measurements, processor(s) 104 may then (i) shift the pixels by linear interpolation and (ii) blend by averaging overlapping sub-regions into a reconstructed image frame. All of the reconstructed image frames for the image set are then integrated and averaged together to produce a single, integrated image that is depicted at a point in time that coincides with the first frame of the image set.

The above steps may be applied to each of the image sets in the FIFO. In order to remove the background objects 204 from the image sets, the reconstructed image sets from a past point in time are extrapolated to the time of the first image set 116 and then subtracted from the first image set 116 to obtain a clutter-suppressed image set 120.

A reconstructed image set from a past point in time is extrapolated to the time of the first image set 116 by calculating the linear offsets between the reconstructed image set from a past point in time and the reconstructed first image set. Using these calculations, the processor(s) 104 shifts and blends the pixels of the reconstructed image set from a past point in time. The result of these operations is a time-adjusted second image set 122 that contains the background objects 204 from some past point in time adjusted to a current point in time. Further, because the foreground object 202 is in constant movement relative to the sensor 102, the extrapolation process does not shift the pixels associated with the foreground object 202, which allows the foreground object 202 to remain visible after the subtraction process described below.

The extrapolation process allows the processor(s) 104 to efficiently subtract the pixels of sequential images from one another because, once the operations described above are performed, the pixels that make up the background objects 204 are in the same location in each sequential image.

Figure 4:
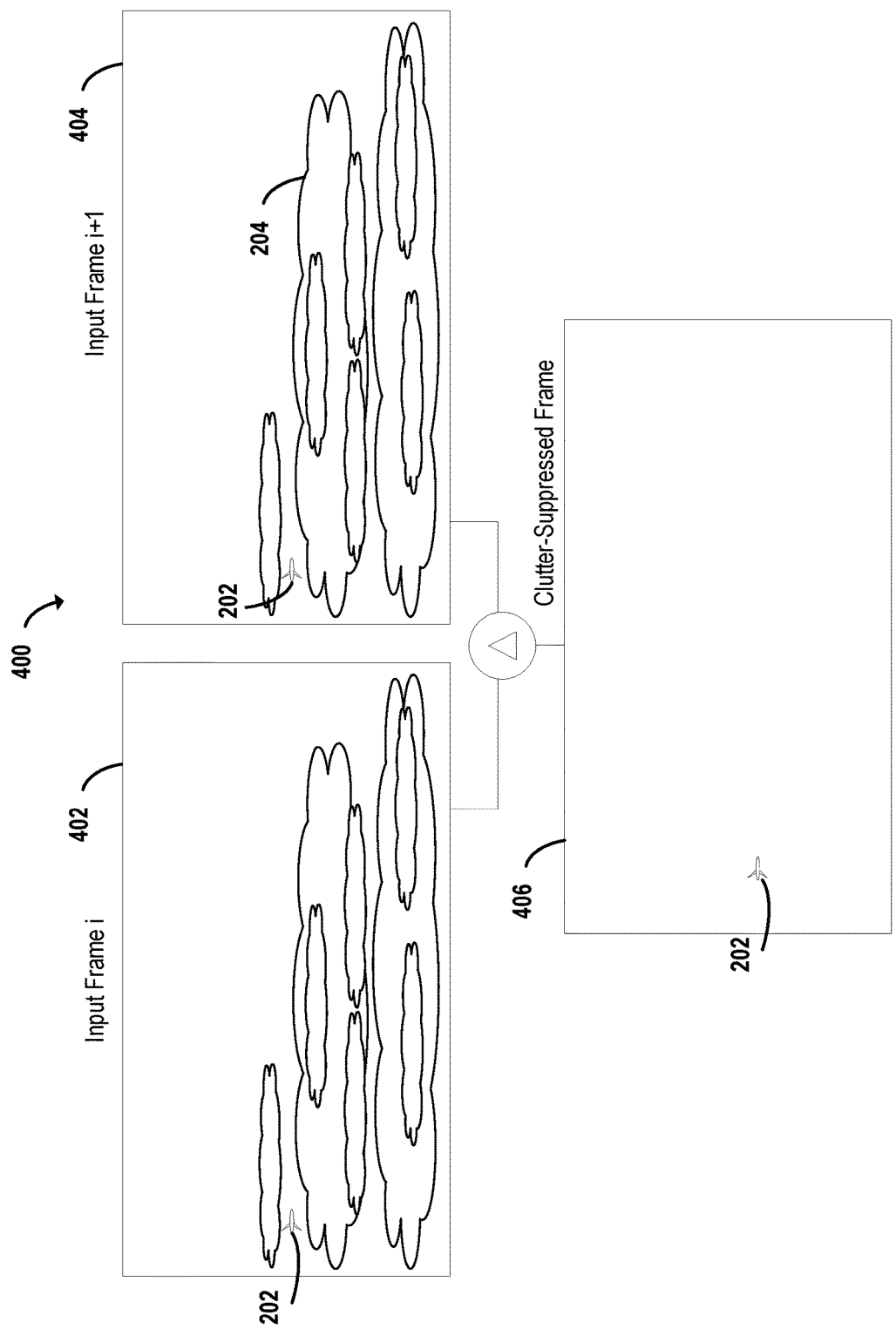
FIG. 4 illustrates an example process to obtain a difference frame, according to an example implementation.

FIG. 4 illustrates an example process 400 to obtain a clutter-suppressed frame 406. The example process 400 includes differencing reconstructed input frame 402 and extrapolated input frame 404 to obtain the clutter-suppressed frame 406.

The reconstructed input frame 402 includes a reconstructed frame of the stream of images 114 captured by sensor 102. The reconstructed input frame 402 may be similar to the example frame 200 as described in FIG. 2. The reconstructed input frame 402 includes the foreground object 202 and the background objects 204.

The extrapolated input frame 404 includes a frame of the second image set 118 of the stream of images 114 that was captured later in time than the reconstructed input frame 402 (indicated by the label "Input Frame i+1) and then extrapolated further in time to the time the reconstructed input frame 402 was captured.

The clutter-suppressed frame 406 is one example frame from the clutter-suppressed image set 120. The clutter-suppressed frame 406 is obtained by subtracting the extrapolated input frame 404 from the reconstructed input frame 402. Subtracting the extrapolated input frame 404 from the reconstructed input frame 402 involves subtracting each pixel of the extrapolated input frame 404 from each corresponding pixel from the reconstructed input frame 402. The clutter-suppressed frame 406, when no remaining noise is present, only contains the foreground object 202 and no background objects 204. As discussed above, the pixels making up the foreground object 202 are not subtracted because the movement of the foreground object 202 is constant with respect to the sensor 102 capturing the stream of images 114.

In some instances, the foreground object 202 may become distorted in the clutter-suppressed frame 406. This may be caused by the existence of overlapping pixels that remain after subtracting the extrapolated input frame 404 from the reconstructed input frame 402. These overlapping pixels may be present as a result of the foreground object 202 moving faster than the background objects 204 relative to the sensor 102. The overlapping pixels cause the foreground object 202 to be more prominent in the clutter-suppressed frame 406, which allows for easy identification of the foreground object 202 in the clutter-suppressed frame 406.

In practice, however, there is typically residual noise and other effects present in the clutter-suppressed frame 406. This can be due to unexpected evolution of the structures making up the background objects 204 (e.g., clouds structures unpredictably disappearing or appearing). To correct this, the processor(s) 104 may apply a process to enhance the Signal-to-Noise Ratio (SNR) of the image, which allows the foreground object 202 to be more easily identified in the clutter-suppressed frame 406.

In one example, this process includes the application of a pulse shape matched filter to the clutter-suppressed frame 406. The pulse shape matched filter may include a pulse-shaping filter that uses a convolution kernel that has been matched to the expected shape of the resultant target pulse after the clutter-suppressed frame 406 is obtained. For example, foreground object 202 may have an expected target pulse shape. The expected target pulse shape may depend on the type of object included in foreground object 202 (i.e., an aircraft may have a particular expected target pulse shape). In operation, when the convolution kernel of the pulse shaped matched filter encounters the expected target pulse shape of the foreground object 202, the pulse shape matched filter enhances the pulse shape of the foreground object 202, which in turn greatly enhances the SNR of the clutter-suppressed frame 406. Due to the amount of possible direction and velocity effects of the background and foreground objects of the image, the pulse shape matched filter may be implemented as a filter bank 124, which contains a number of filters to identify the resulting energy of the foreground object 202.

After the clutter-suppressed frame 406 has been filtered, there may be multiple pixels that could be considered the foreground object 202 when a tanker operator examines the frame on an image display. In order to determine which pixel(s) represent the foreground object 202, as opposed to remaining noise, a target detector is used. The target detector applies an adaptive Constant False Alarm Rate (CFAR) detection process that examines the local region around any pixel for statistics and automatic detection threshold settings. The use of CFAR detection may be particularly beneficial as it allows for the implementation of automatic threshold settings based on the amount of noise present in the clutter-suppressed frame 406. For example, if the clutter-suppressed frame 406 has a low amount of noise, the threshold settings may be automatically set lower because of a lower risk of false detection. In contrast, if the clutter-suppressed frame 406 has a large amount of noise, the threshold settings may be automatically set higher to distinguish the foreground object 202 from the background objects 204. Using this information, the processor(s) 104 can highlight or mark the foreground object 202 on the image display for quick and efficient identification of the foreground object 202.

In another example, the process of enhancing the SNR ratio of the clutter-suppressed frame 406 includes applying a positive CFAR and a negative CFAR detection process to the clutter-suppressed frame 406 without filtering. Applying the positive CFAR detection process and the negative CFAR detection process to the clutter-suppressed frame 406 results in two independent images that contain positive pulses and negative pulses, respectively. These positive and negative pulses may correspond to the foreground object 202 or to false targets caused by residual noise in the sensor 102. In order to remove the false targets, a binary map may be applied, which assigns a 1 to all potential targets and a 0 to non-targets. Then, binary dilation is applied to grow the areas of the binary map that contain potential targets. The two independent images are then multiplied together to remove the false detections, leaving only the target pulses that correspond to the foreground object 202.

Figure 5:
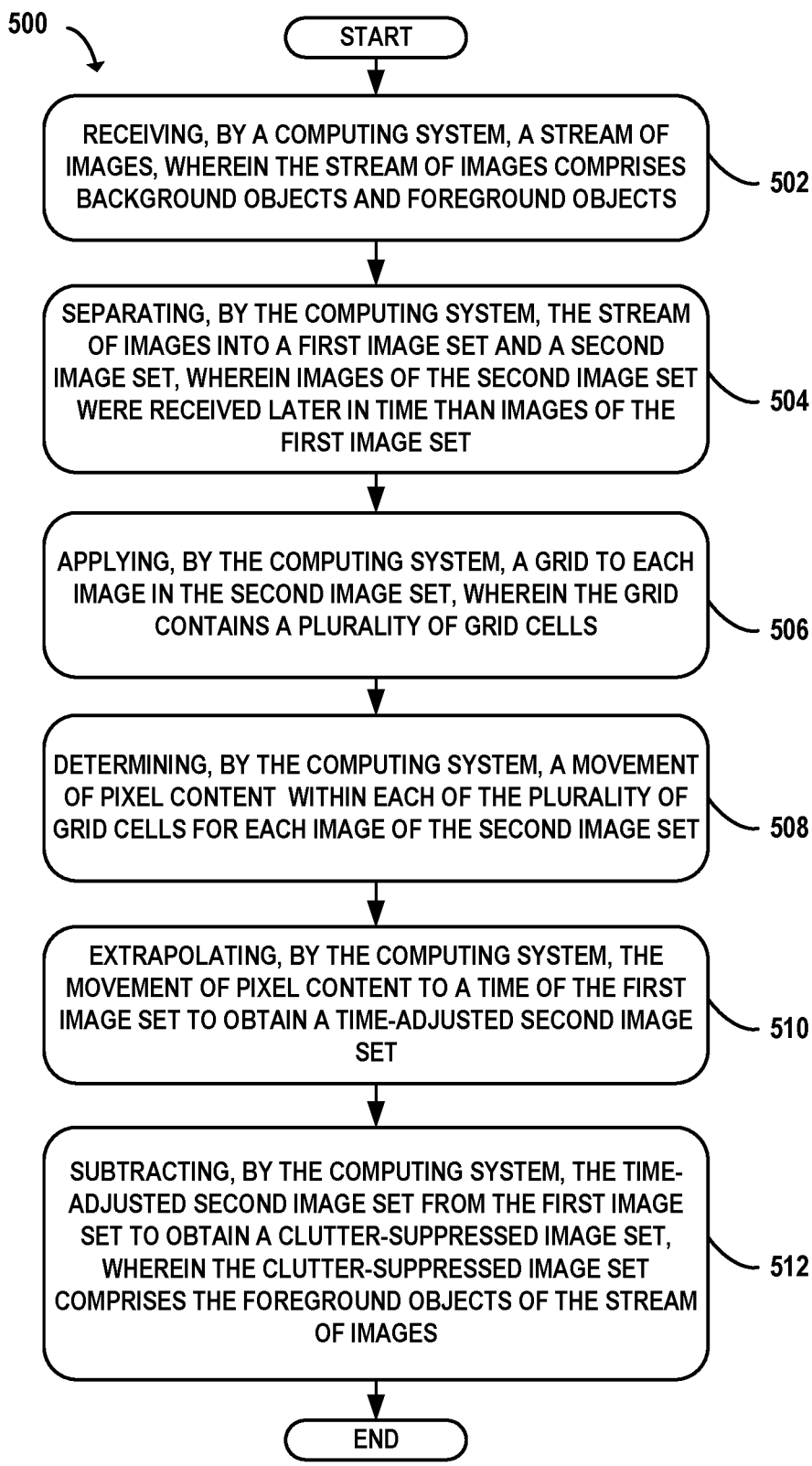
FIG. 5 shows a flowchart of an example method of dynamically suppressing background noise and clutter, according to an example implementation.

FIG. 5 shows a flowchart of an example of a method 500 of dynamically suppressing background noise and clutter, according to an example implementation. Method 500 shown in FIG. 5 presents an example of a method that could be used with the computing system 100 shown in FIG. 1 or with components of the computing system 100, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage medium in a machine-readable format, or on other non-transitory media or articles of manufacture. The computer readable medium may include non-transitory computer readable medium or memory, for example, such as a computer-readable medium that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving, by a computing system, a stream of images, wherein the stream of images comprises background objects and foreground objects.

At block 504, the method 500 includes separating, by the computing system, the stream of images into a first image set and a second image set, wherein images of the second image set were received later in time than images of the first image set.

At block 506, the method 500 includes applying a grid to each image in the second image set, wherein the grid contains a plurality of grid cells.

At block 508, the method 500 includes determining a movement of pixel content within each of the plurality of grid cells for each image of the second image set.

At block 510, the method 500 includes extrapolating the movement of pixel content to a time of the first image set to obtain a time-adjusted second image set.

At block 512, the method 500 includes subtracting the time-adjusted second image set from the first image set to obtain a clutter-suppressed image set, wherein the clutter-suppressed image set comprises the foreground objects of the stream of images.

FIG. 6 shows a flowchart of an example method for use with the method 500, according to an example implementation. At block 514, functions include applying, by the computing system, a pulse shape matched filter to the clutter-suppressed image set to enhance a Signal-To-Noise-Ratio (SNR) of the clutter-suppressed image set.

FIG. 7 shows a flowchart of an example method for performing the applying as shown in block 514, according to an example implementation. At block 516, functions include applying a filter bank to the clutter-suppressed image set.

FIG. 8 shows a flowchart of an example method for use with the method 500, according to an example implementation. At block 518, functions include detecting, by the computing system, the foreground objects of the stream of images by applying Constant False Alarm Rate (CFAR) detection to the clutter-suppressed image set.

FIG. 9 shows a flowchart of an example method for use with the method 500, according to an example implementation. At block 520, functions include applying, by the computing system, the grid to each image in the first image set. At block 522, functions include determining, by the computing system, a movement of pixel content associated with the first image set within each of the plurality of grid cells.

Figure 10:
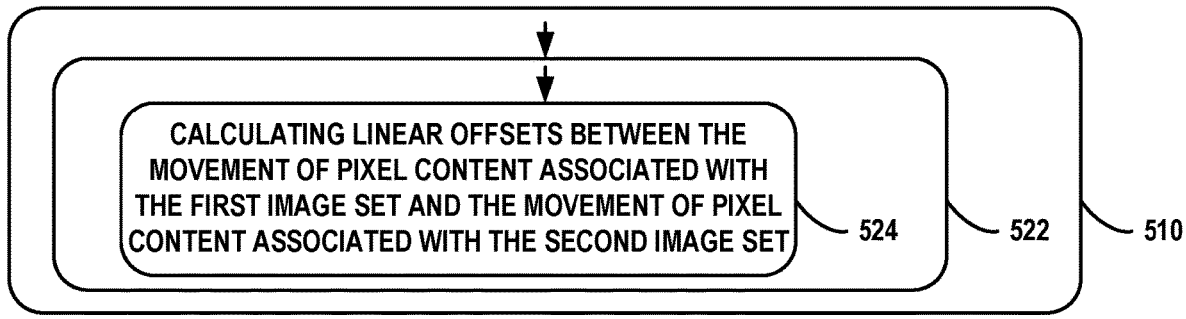
FIG. 10 shows a flowchart of another example method for use with the method shown in FIG. 5, according to an example implementation.

FIG. 10 shows a flowchart of an example method for the extrapolating as shown in block 510 and 522, according to an example implementation. At block 524, functions include calculating linear offsets between the movement of pixel content associated with the first image set and the movement of pixel content associated with the second image set.

Figure 11:
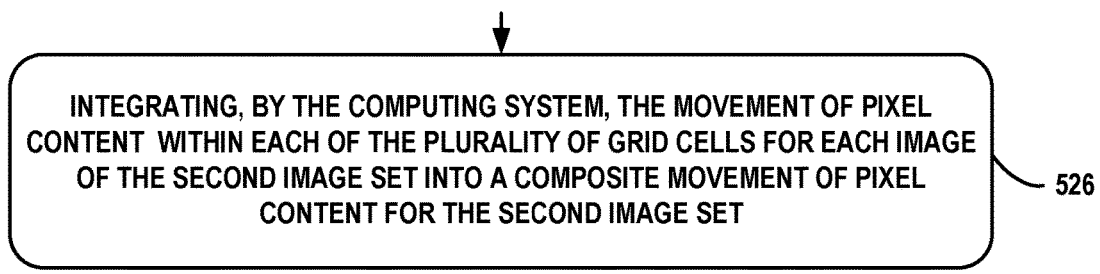
FIG. 11 shows a flowchart of another example method for use with the method shown in FIG. 5, according to an example implementation.

FIG. 11 shows a flowchart of an example method for use with the method 500, according to an example implementation. At block 526, functions include integrating, by the computing system, the movement of pixel content within each of the plurality of grid cells for each image of the second image set into a composite movement of pixel content for the second image set.

Figure 12:
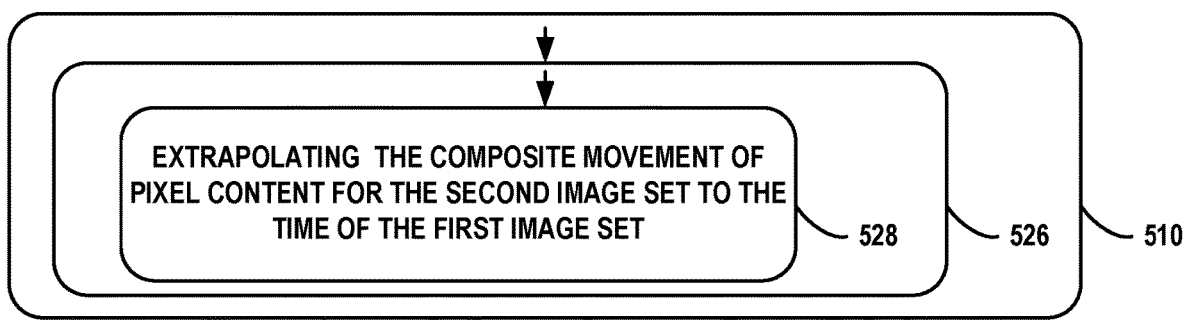
FIG. 12 shows a flowchart of another example method for use with the method shown in FIG. 5, according to an example implementation.

FIG. 12 shows a flowchart of an example method for extrapolating as shown in block 510 and 526, according to an example implementation. At block 528, functions include extrapolating the composite movement of pixel context for the second image set to the time of the first image set.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A computer-implemented method for dynamic background clutter suppression comprising:
   receiving, by a computing system, a stream of images, wherein the stream of images comprises background objects and foreground objects;
   separating, by the computing system, the stream of images into a first image set and a second image set, wherein images of the second image set were received later in time than images of the first image set;
   applying, by the computing system, a grid to each image in the second image set, wherein the grid contains a plurality of grid cells;
   determining, by the computing system, a movement of pixel content within each of the plurality of grid cells for each image of the second image set;
   extrapolating, by the computing system, the movement of pixel content to a time of the first image set to obtain a time-adjusted second image set; and
   subtracting, by the computing system, the time-adjusted second image set from the first image set to obtain a clutter-suppressed image set, wherein the clutter-suppressed image set comprises the foreground objects of the stream of images; and
   applying, by the computing system, a pulse shape matched filter to the clutter-suppressed image set to enhance a Signal-To-Noise-Ratio of the clutter-suppressed image set.

2. The computer-implemented method of claim 1, wherein applying, by the computing system, the pulse shape matched filter to the clutter-suppressed image set comprises applying a filter bank to the clutter-suppressed image set.

3. The computer-implemented method of claim 1, further comprising detecting, by the computing system, the foreground objects of the stream of images by applying Constant False Alarm Rate detection to the clutter-suppressed image set.

4. The computer-implemented method of claim 1, further comprising:
   applying, by the computing system, the grid to each image in the first image set; and
   determining, by the computing system, a movement of pixel content associated with the first image set within each of the plurality of grid cells.

5. The computer-implemented method of claim 4, wherein extrapolating, by the computing system, the movement of pixel content associated with the second image set to the time of the first image set comprises calculating linear offsets between the movement of pixel content associated with the first image set and the movement of pixel content associated with the second image set.

6. The computer-implemented method of claim 1, further comprising:
   integrating, by the computing system, the movement of pixel content within each of the plurality of grid cells for each image of the second image set into a composite movement of pixel content for the second image set, wherein extrapolating, by the computing system, the movement of pixel content to the time of the first image set to obtain the time-adjusted second image set comprises extrapolating the composite movement of pixel content for the second image set to the time of the first image set.

7. A non-transitory computer-readable medium having stored thereon program instructions that upon execution by a processor, cause a computing system to perform a set of acts comprising:
   receiving a stream of images, wherein the stream of images comprises background objects and foreground objects;
   separating the stream of images into a first image set and a second image set, wherein images of the second image set were received later in time than images of the first image set;
   applying a grid to each image in the second image set, wherein the grid contains a plurality of grid cells;
   determining a movement of pixel content within each of the plurality of grid cells for each image of the second image set;
   extrapolating the movement of pixel content to a time of the first image set to obtain a time-adjusted second image set;
   subtracting the time-adjusted second image set from the first image set to obtain a clutter-suppressed image set, wherein the clutter-suppressed image set comprises the foreground objects of the stream of images; and
   applying, by the computing system, a pulse shape matched filter to the clutter-suppressed image set to enhance a Signal-To-Noise-Ratio of the clutter-suppressed image set.

8. The non-transitory computer-readable medium of claim 7, wherein applying, by the computing system, the pulse shape matched filter to the clutter-suppressed image set comprises applying a filter bank to the clutter-suppressed image set.

9. The non-transitory computer-readable medium of claim 7, further comprising detecting, by the computing system, the foreground objects of the stream of images by applying Constant False Alarm Rate detection to the clutter-suppressed image set.

10. The non-transitory computer-readable medium of claim 7, further comprising:
    applying, by the computing system, the grid to each image in the first image set; and
    determining, by the computing system, a movement of pixel content associated with the first image set within each of the plurality of grid cells.

11. The non-transitory computer-readable medium of claim 10, wherein extrapolating, by the computing system, the movement of pixel content associated with the second image set to the time of the first image set comprises calculating linear offsets between the movement of pixel content associated with the first image set and the movement of pixel content associated with the second image set.

12. The non-transitory computer-readable medium of claim 10, further comprising:
    integrating, by the computing system, the movement of pixel content within each of the plurality of grid cells for each image of the second image set into a composite movement of pixel content for the second image set, wherein extrapolating the movement of pixel content to the time of the first image set to obtain the time-adjusted second image set comprises extrapolating the composite movement of pixel content for the second image set to the time of the first image set.

13. A computing system comprising:
one or more processors; and
non-transitory computer-readable media having stored thereon program instructions that, upon execution by the one or more processors, cause the computing system to perform a set of acts comprising:
receiving a stream of images, wherein the stream of images comprises background objects and foreground objects;
separating the stream of images into a first image set and a second image set, wherein images of the second image set were received later in time than images of the first image set;
applying a grid to each image in the second image set, wherein the grid contains a plurality of grid cells;
determining a movement of pixel content within each of the plurality of grid cells for each image of the second image set;
extrapolating the movement of pixel content to a time of the first image set to obtain a time-adjusted second image set;
subtracting the time-adjusted second image set from the first image set to obtain a clutter-suppressed image set, wherein the clutter-suppressed image set comprises the foreground objects of the stream of images; and
applying, by the computing system, a pulse shape matched filter to the clutter-suppressed image set to enhance a Signal-To-Noise-Ratio of the clutter-suppressed image set.

14. The computing system of claim 13, wherein applying, by the computing system, the pulse shape matched filter to the clutter-suppressed image set comprises applying a filter bank to the clutter-suppressed image set.

15. The computing system of claim 13, further comprising detecting, by the computing system, the foreground objects of the stream of images by applying Constant False Alarm Rate detection to the clutter-suppressed image set.

16. The computing system of claim 13, further comprising:
applying, by the computing system, the grid to each image in the first image set; and
determining, by the computing system, a movement of pixel content associated with the first image set within each of the plurality of grid cells.

17. The computing system of claim 16, wherein extrapolating, by the computing system, the movement of pixel content associated with the second image set to the time of the first image set comprises calculating linear offsets between the movement of pixel content associated with the first image set and the movement of pixel content associated with the second image set.

18. The computing system of claim 13, further comprising:
integrating, by the computing system, the movement of pixel content within each of the plurality of grid cells for each image of the second image set into a composite movement of pixel content for the second image set, wherein extrapolating, by the computing system, the movement of pixel content to the time of the first image set to obtain the time-adjusted second image set comprises extrapolating the composite movement of pixel content for the second image set to the time of the first image set.

19. The computer-implemented method of claim 1, wherein separating the stream of images into the first image set and the second image set comprises storing the first image set and the second image set in a First-In-First-Out (FIFO) data structure.

20. The non-transitory computer-readable medium of claim 7, wherein separating the stream of images into the first image set and the second image set comprises storing the first image set and the second image set in a First-In-First-Out (FIFO) data structure.

* * * * *